No. 770,815. PATENTED SEPT. 27, 1904.
C. J. MALINGS.
GAME.
APPLICATION FILED MAY 13, 1903.
NO MODEL.
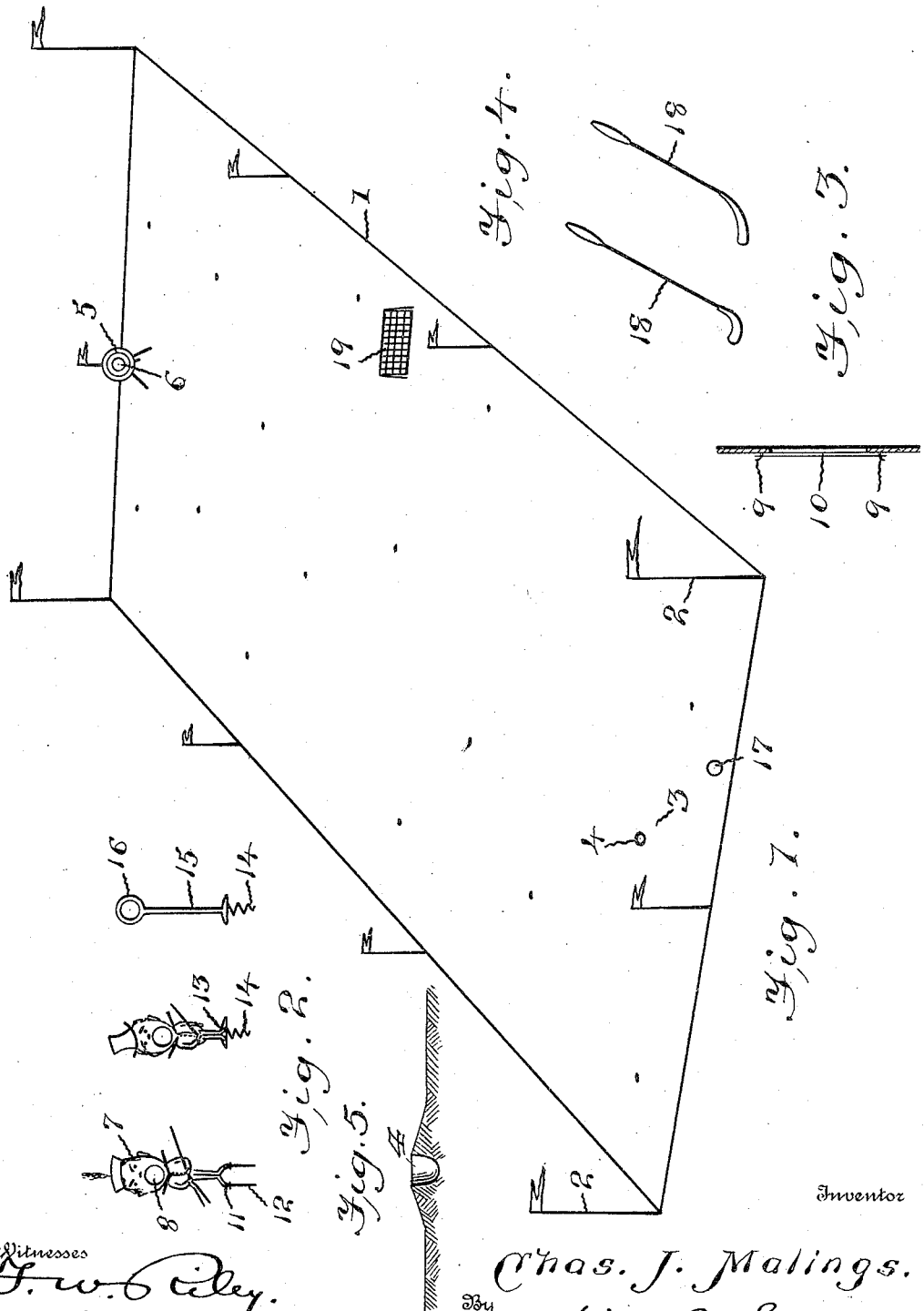
Witnesses
F. W. Riley.
Herbert D. Lawson.
Inventor
Chas. J. Malings.
By Victor J. Evans
Attorney No. 770,815. Patented September 27, 1904.

UNITED STATES PATENT OFFICE.

CHARLES J. MALINGS, OF EASTHAMPTON, MASSACHUSETTS.

GAME.

SPECIFICATION forming part of Letters Patent No. 770,815, dated September 27, 1904.

Application filed May 13, 1903. Serial No. 156,955. (No model.)

*To all whom it may concern:*

Be it known that I, CHARLES J. MALINGS, a citizen of the United States, residing at Easthampton, in the county of Hampshire and State of Massachusetts, have invented new and useful Improvements in Games, of which the following is a specification.

My invention relates to new and useful improvements in games; and its object is to provide a game which can be used either outdoors or indoors.

A further object is to provide wickets of novel form, the openings in which are removed from the ground, thereby necessitating the projection of a ball from the ground upward through the openings.

Another object is to provide means for accurately indicating the passage of a ball through the wicket.

With the above and other objects in view the invention consists in providing a preferably rectangular field having a raised portion within the center of which is a hole or recess. A suitable target is located at the opposite end of the field, and at desired points upon the field are arranged wickets of desired form, the openings in which are at points removed from the bases of the wickets.

The invention also consists in the further novel construction and combination of parts hereinafter more fully described and claimed, and illustrated in the accompanying drawings, showing the preferred form of my invention, and in which—

Figure 1 is a perspective view of a field laid out in accordance with my invention and showing in dotted lines some of the positions in which the wickets may be placed. Fig. 2 shows in detail some forms of wickets which may be employed. Fig. 3 is an enlarged section through a portion of one of the wickets and showing the covering for the aperture in the wicket. Fig. 4 shows in detail views of clubs which may be employed for driving the balls, and Fig. 5 is a section through the raised portion of the field and showing the hole in the center thereof.

Referring to the figures by numerals of reference, 1 is a preferably rectangular field which is outlined in any suitable manner, as by means of chalk-lines, cord, &c., according to the location of the field. The boundaries of the field are preferably indicated by flags 2, which are arranged at the corners and at suitable points therebetween. The field is raised near one end, as shown at 3, and the apex of this raised portion is provided with a recess 4. At the opposite end of the field is located a target 5 of any suitable form, the bull's-eye 6 of which may be connected in any suitable manner to a gong or other signal which is adapted to be sounded when a bell is brought in contact therewith. Arranged upon the field at suitable points are wickets of novel form. As shown in Fig. 2, the wickets 7 may be representations of men, the mouths 8 of which are enlarged so as to form openings of sufficient size to permit the passage of a ball therethrough. Hooks 9 or other suitable devices may be arranged adjacent the openings 8 for the purpose of holding sheets of paper 10 or other material which may be readily broken in position over the opening 8. The figures may be arranged upon an arch 11, having staples 12, adapted to be inserted into the ground, or, if desired, this arch may be dispensed with, as shown at 13, Fig. 2. Moreover, in lieu of employing staples 12 a screw 14 may be used for fastening the wickets in position upon the field. While the wickets are preferably representations such as above described, I can, if desired, form them of rods 15, having eyes 16 at their upper ends.

As hereinbefore stated, the wickets are adapted to be placed at suitable points upon the field, and I have indicated some of these points by dots in Fig. 1. To play the game, a ball 17 is placed at a suitable starting-point, such as indicated in Fig. 1, and is struck by means of a club 18, (shown in Fig. 4,) the object being to so hit the ball as to cause it to rise from the ground and pass through the aperture 8 in the nearest wicket. It will be understood that the paper covering the aperture will be broken by the ball, and the accuracy of the stroke will thus be positively determined. The strokes are continued alternately by the players until the ball has passed through each of the wickets. The game is then continued by knocking the ball toward the target 5, and after the bull's-eye 6 has been struck thereby the game is finished by propelling the ball toward the raised portion 3 of the field and depositing it in the recess 4. The person covering the field with the least number of strokes wins the game. If desired, one player may use the wickets at the left of the field and the other use the wickets at the right of the field and both players drive the ball through their respective wickets, thence to the target, and finally to the recess 4. The clubs employed may be of any suitable form, the feet thereof being preferably so shaped as to send the ball from the ground when struck thereby. In Fig. 4 I have shown two forms of clubs which may be employed. By providing an arch 11 at the base of the wicket the balls can be returned therethrough and brought to position directly in front of the wicket. As shown in Fig. 1, suitable obstructions, such as nets 19, may be arranged in front of some of the wickets, so as to render the playing of the game more difficult. It will be understood that any desired number of wickets may be employed and that they may be placed in any desired position upon the field. Moreover, in lieu of laying out the field upon a lawn of suitable size it can be marked upon a floor. Where the game is played indoors, a floor is preferably covered with a heavy carpet having a thick pile, so as to permit the club 18 to be swung into position slightly below the ball, and thereby permit the same to be driven upward into the air.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus fully described the invention, what is claimed as new is—

1. In a game apparatus of the character described, a wicket comprising a stem, an arch at one end thereof, supporting-staples extending from the arch, a head at the other end of the stem and having an aperture therein, hooks extending from the head, and a frangible cover detachably engaging the hooks and secured thereby over the aperture.

2. In a game apparatus of the character described, a wicket representing a man and comprising a stem, an arch formed by the feet of the figure, staples extending from the arch, a head having an aperture therein forming the mouth of the figure, hooks extending from the head adjacent the aperture, and a weak fibrous cover extending over the aperture and detachably engaging the hooks.

In testimony whereof I affix my signature in presence of two witnesses.

CHARLES J. MALINGS.

Witnesses:
F. M. WHITEMAN,
WALTER WHITEMAN.